(12) United States Patent
Khan

(10) Patent No.: US 7,259,288 B2
(45) Date of Patent: Aug. 21, 2007

(54) ENHANCED HYDROGEN RECOVERY FOR HYDROPROCESSING UNITS

(75) Inventor: Rashid Khan, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 698 days.

(21) Appl. No.: 10/788,947

(22) Filed: Feb. 26, 2004

(65) Prior Publication Data

US 2005/0188841 A1    Sep. 1, 2005

(51) Int. Cl.
   *C07C 7/08* (2006.01)
   *F25J 3/02* (2006.01)
(52) U.S. Cl. .................. 585/809; 585/833; 62/635; 62/625
(58) Field of Classification Search ............. 585/809, 585/833; 62/632, 635, 625
   See application file for complete search history.

(56) References Cited

U.S. PATENT DOCUMENTS

| | | | | |
|---|---|---|---|---|
| 4,935,043 A | * | 6/1990 | Blanc et al. | 62/625 |
| 5,019,143 A | * | 5/1991 | Mehrta | 62/625 |
| 5,326,929 A | * | 7/1994 | Mehra et al. | 585/809 |
| 5,546,764 A | * | 8/1996 | Mehra | 62/625 |

* cited by examiner

*Primary Examiner*—Tam M. Nguyen
(74) *Attorney, Agent, or Firm*—Abelman, Frayne & Schwab

(57) ABSTRACT

A process for the recovery of high purity hydrogen for recycling to a hydroprocessing or similar unit located in an integrated refinery facility includes sampling and providing analytical information on the make-up of the hydrogen-containing feedstream entering the bottom of a stripping column and the composition of the hydrogen recycle stream at, and/or approaching the top of the stripping column to a computer-directed control system in real time for the purpose of controlling the selection and the volumetric flow rate of one or more "refinery solvents" into the column to maximize the removal of non-hydrogen gases from the feedstream and to thereby maximize the percentage of hydrogen in the recycle gas stream. The "refinery solvent" used in the stripping column is any one or more compounds that are generated as product or by-product streams in the integrated refinery facility that are readily available for diversion in the required quantities for use a solvent to absorb or strip one or more compounds from the hydrogen-containing feedstream at the integrated refinery facility. The refinery solvent is preferable subsequently flashed to remove separated compounds and returned to its original product stream.

20 Claims, 3 Drawing Sheets

ENHANCED HYDROGEN RECOVERY FOR HYDROPROCESSING UNITS

FIELD OF THE INVENTION

The invention relates to a method and apparatus for improving the recovery of hydrogen gas from a gaseous process feedstream that also contains methane and other hydrocarbon gases utilizing a liquid solvent in counter-current flow.

BACKGROUND OF THE INVENTION

A wide variety of methods and solvents have been disclosed for use in recovering higher yields of hydrogen for recycling in various hydroprocessing treatments. Obtaining a higher yield and purity of hydrogen for a recycled feedstream allows the plant to operate more efficiently and minimize the hydrogen production capacity and therefore the capital required to construct and operate the hydrogen production facility.

It is well known in the art to employ liquid solvents to strip methane, acid gases and other hydrocarbon gases from a mixed process stream containing hydrogen. While it is possible to strip methane and other undesired gases from the stream to leave a relatively high purity hydrogen stream of 98%, or better, there are a number of parameters that must be taken into account in designing and operating a practical system. For example, certain solvents that are highly efficient, e.g., have a high solubility for methane and other gases, would not be considered practical choices because of their cost.

It is also known in the chemical industry to analyze the quality of feedstock and process streams utilizing advanced analytical chemistry, alone or in combination with advanced mathematical models, chemometrics and correlations. These methods and systems permit efficient and rapid recovery of data for operating processes. Existing industrial analytical and control systems thus provide means for real-time changes of operating conditions to maintain product quality and process efficiency.

It is therefore an object of the present invention to provide a method and apparatus in which one or more readily available "refinery solvents" are utilized in a counter-current flow stripping column to achieve the maximum purity of hydrogen in the recycle gas stream leaving the top of the column by selective absorption of one or more non-hydrogen compounds mixed with the hydrogen passing through the column.

As used herein, the term "refinery solvents" means any one or more compounds that are generated as product or by-product streams in the same refinery facility or other chemical processing facility as the feedstream in which the percent hydrogen content is to be enhanced, and that are readily available for diversion in the required quantities for use as a solvent to absorb or strip one or more compounds from the hydrogen-containing feedstream in the practice of the invention. Relevant processes would include liquid/gas separation processes.

It is a further object of the invention to provide apparatus and a method of operation that selectively controls the type, volume and flow rate of one or more refinery solvents in response to the real time analytical results of the gases moving through the stripping column in order to obtain a hydrogen stream of maximum purity from a refinery process.

It is yet another object of the invention to employ analytical instruments and a computer-controlled flow regulation system with appropriate software to achieve the maximum purity of hydrogen by the selection from one or more readily available refinery solvents of a liquid absorbent composition that affords maximum solubility for the non-hydrogen gaseous components in the feedstream to the stripping column.

Another object of the invention is to provide an integrated real-time feedstream analytical system to monitor and control solvent selection and solvent flowrate based upon the solubility and selectivity of feedstream solutes in the refinery solvent or solvents available for use in the hydrogen purification process.

SUMMARY OF THE INVENTION

The above objects and other advantages are obtained by the apparatus and method of the invention in which analytical information on the make-up of the hydrogen-containing feedstream entering the bottom of a stripping column, as well as the composition of the hydrogen recycle stream at and/or approaching the top of the stripping column are provided to a computer-directed control system in real time for the purpose of controlling the selection and the volumetric flow rates of one or more refinery solvents into the column to thereby maximize the removal of non-hydrogen gases from the feedstream and concomitantly maximize the percentage of hydrogen in the recycle gas stream.

As used herein, the term "refinery solvents" means any one or more compounds that are generated as product or by-product streams in the integrated refinery facility or other chemical processing facility and that is readily available for diversion in the required quantities for use as a solvent to absorb or strip one or more compounds from the hydrogen-containing feedstream in the practice of the invention at the same site or complex.

As will be apparent to one of ordinary skill in the art, a significant financial advantage and cost savings will be realized when the solvent or solvents for the non-hydrogen components or components can be diverted in whole or in part from an existing process stream in the integrated refinery facility, rather than being purchased from a third-party vendor or even being transported via tanktruck or rail car from a co-owned, but remote production facility.

The refinery solvent can either be recycled in the stripping process once the dissolved gases have been removed, or the treated refinery solvent can be returned to the original product stream from which it was removed. Depending upon the nature of the dissolved gases and the ability to remove them from the refinery solvent, one preferred embodiment of the method of the invention returns the refinery solvent after extraction to be mixed with its original product stream where any remaining dissolved gases will be highly diluted. This method will avoid an undesirable buildup in the solvent (s) of any dissolved gases during subsequent use in the stripping column and the requirement for purging a portion of the recycled solvent by providing a continuous flow of fresh solvent to the top of the column.

In one preferred embodiment, the monitoring of the composition of the hydrogen-containing stream is substantially continuous. This embodiment, can be utilized when the composition is known to vary due to upstream conditions. Continuous or very frequent monitoring can be used during planned transition periods.

Where the composition of the feedstream entering the bottom of the stripper column is of generally consistent composition with little variation, the continuous monitoring step and apparatus can be eliminated. In such a case, analytical data is obtained periodically for the composition of the exiting hydrogen gas stream and/or from one or more other sampling positions lower in the column.

The continuous or periodic monitoring and generation in real time of the nature and proportion of the compounds in the gaseous feed stream is utilized to make any necessary changes in the selection and/or flow rate of one or more of the refinery solvents into the top of the column to maximize absorption of the non-hydrogen gas or gases in this component. Such modifications in refinery gas composition and/or flow rates can be occasioned by upstream changes in operating temperature and/or pressure. Such changes to the feedstream can also occur due to changes in surrounding ambient climatic conditions. These would include significant temperature swings as can occur in continuous operations between night time temperatures and day time temperatures in desert-like areas; seasonal changes, e.g., winter to summer; and transitory conditions such as darkened skies reducing sun loads followed by lengthy rain storms that can reduce the temperature of the exposed refinery equipment.

As will be understood from the above description, if the composition of the hydrogen-containing feedstream entering the bottom of the stripper column is subject to variation, the efficient operation of the method and apparatus of the invention will be greatly enhanced by regular periodic or continuous sampling and monitoring of the various compounds that are to be removed by the refinery solvents. An appropriately programmed instrument control system receives the results of the analysis in digital form, compares it to a reference data field to determine the required volume and type of refinery solvent required to absorb each compound reported in the analytical data. Any necessary adjustments are made to the refinery solvent control valves to assure maximum absorption.

The use of analytical apparatus having a plurality of sampling probes located at vertical positions in the stripping column and permitting real time monitoring of the removal of gases from the hydrogen stream permits rapid adjustment of the refinery solvent(s) flow in response to the data variations.

Additional data that must be fed to the control system includes the volumetric flow rate of the gaseous feed stream into the stripping column and the operating temperature and pressure in the column.

In a further aspect of the invention, the temperature of the one or more refinery solvents can be varied in order to meet solubility requirements. Thus, a lowering of the operating temperature of the refinery solvent stream will increase the solubility of the gaseous compounds which it contacts. As a result, the volume of solvent required to dissolve a given quantity of soluble gaseous compound can be reduced by lowering the operating temperature in the column.

In one preferred embodiment, the operating temperature of the stripping column is in the range of from 0° F. to 70° F., or more preferably from −30° F. to 70° F., thereby greatly increasing the solubility of the non-hydrogen gases in the refinery solvent.

Analytical systems and related software that are suitable for use in the practice of the invention are known in the art. Available software and software/hardware systems with the capability of predicting solubilities of gases in liquid solvents at various temperatures, pit conditions, pressures, the presence of other gases, and other prevailing conditions can be advantageously utilized in the practice of the invention.

An enhanced hydrocarbon analyzer system is sold by ABB under the brandname TOPNIR™, and includes a software/hardware package that is readily adaptable for use with the present invention. Other suitable industrial software packages are sold by Hyprotech under the brandname HYSYS™ and by Aspen Technology, Inc. of Cambridge, Mass. under the brandname ASPENTECH™. The latter software is utilized for the simulation and/or optimization of refinery operations.

Other suitable process control systems are available from Honeywell Inc. of Morristown, N.J. under the designation RMPCT; from Shell Global Solutions, Inc. of the Netherlands under the designation SMOC; from Invensys/Foxboro of Foxboro, Mass. under the designation Connaisseurs; and from Finnegan/INCOS Inc. under the designation INCA.

The preferred refinery solvents can be selected, if available, from the group including butane, pentane, hexane, septane, iso-octane and n-octane, 1-octene, methylcyclohexane, 1,2,4-trimethylbenzene, iso-paraffins and/or gasoline. Combinations of iso-octane and methylcyclohexane are especially preferred since they show respectively, highest solubility with reasonable selectivity and highest selectivity with reasonable solubility.

In a further preferred embodiment of the invention for enhancing the recovery of hydrogen from hydroprocessor off gases is the introduction of the gaseous feedstream into a volume of the refinery solvent that has passed through the stripping column and agitating the gas/liquid mixture to maximize the mass transfer of the non-hydrogen component into the refinery solvent to the point of saturation. This initial adsorption step will permit the process to operate at a relatively high temperature to obtain an equivalent enhancement of the purity of the hydrogen off gas from the upper end of the stripper.

Intimate mixing of the gas and liquid phases to optimize the efficient adsorption can be accomplished utilizing apparatus and process control means that are well known to those of ordinary skill in the art. For example, the gas can be introduced into the liquid in the form of small bubbles via ports fed by conduits in the blades of a rotating impeller immersed in the liquid. Baffles and other similar means can be utilized to maximize the contact time between the phases. In the most preferred embodiment of this aspect of the process, the refinery solvent withdrawn from the bottom of the stripping column is saturated with methane and/or any of the other hydrocarbons or acid gases comprising the non-hydrogen component of the feedstream.

As will be apparent to one of ordinary skill in the art, this preliminary processing pretreatment to enhance the hydrogen concentration, while at the same time maximizing the potential ability of the refinery solvent to remove the non-hydrogen component can be accomplished in a separate vessel. However, efficiencies and economies in operation and construction can be achieved by incorporating the mixing apparatus into the bottom of the stripping column.

A further advantage of this pretreatment is to minimize the effect of minor variations in the composition of the gaseous feedstream to the stripping, thereby improving the ability to operate the stripper at a steady state condition. In this embodiment, an excess of refinery solvent is required to assure sufficient capacity in the solvent after passing through the column. As will be apparent to one of ordinary skill in the art, maintenance of a steady state in the composition of the feedstream passing upwardly through the column will enhance efficiency and ultimately, the increase recovery of purified hydrogen in the off gas.

In addition to controlling the flow rates and the relative proportions of the one or more refinery solvents introduced into the top of the stripping column, other parameters that can be modified to effect the maximum purity of the hydrogen off-gas are the temperature of the solvents, the temperature of the gaseous feedstream entering the bottom of the column and the column operating pressure.

Information about the partial vapor pressures and relative solubility of methane and other acid gases and hydrocarbons likely to be present in the non-hydrogen component in the refinery solvents available for use in the process of the invention are readily available from the technical literature, including handbooks. One such article providing useful information comparing the solubility and selectivity of hydrogen and methane in various solvents is by Pruden, B. B. and Paramanu, S. P., entitled "Solubility Study for the Purification of High Pressure Hydrocracker Off-Gas by an Absorption-Stripping Process," Can. J. Chem Engr., Vol 75, p 535 (June 1997).

BRIEF DESCRIPTION OF THE DRAWINGS

The invention will be further described with reference to the attached drawings in which like elements are referred to by the same numbers and where.

DETAILED DESCRIPTION OF THE PREFERRED EMBODIMENTS

Since the invention provides a substantial improvement over the processes of the prior art, it is appropriate to describe a typical and representative hydroprocess of the prior art as currently practiced, and to relate its limitations in order to provide an enhanced understanding and appreciation of the advantages of the present invention. In this context, FIGS. 1 and 2 are provided as schematic illustrations of representative prior art hydrocracking units of a type utilized to provide middle distillates, such as jet fuel and diesel fuel.

As will be understood by those of ordinary skill in the art, various modifications to the process, apparatus, catalysts and operating conditions and steps are possible within the basic elements of the unit operation described. In this regard, a number of competitive hydrocracking technology packages are commercially available from petroleum engineering and refining companies. Many of these commercial processes are proprietary and are specifically designed and adapted for use under particular operating conditions and with specified feed stocks. The following description of the prior art hydrocracking processes is intended to be general and illustrative to one of ordinary skill in the art.

Figure 1:
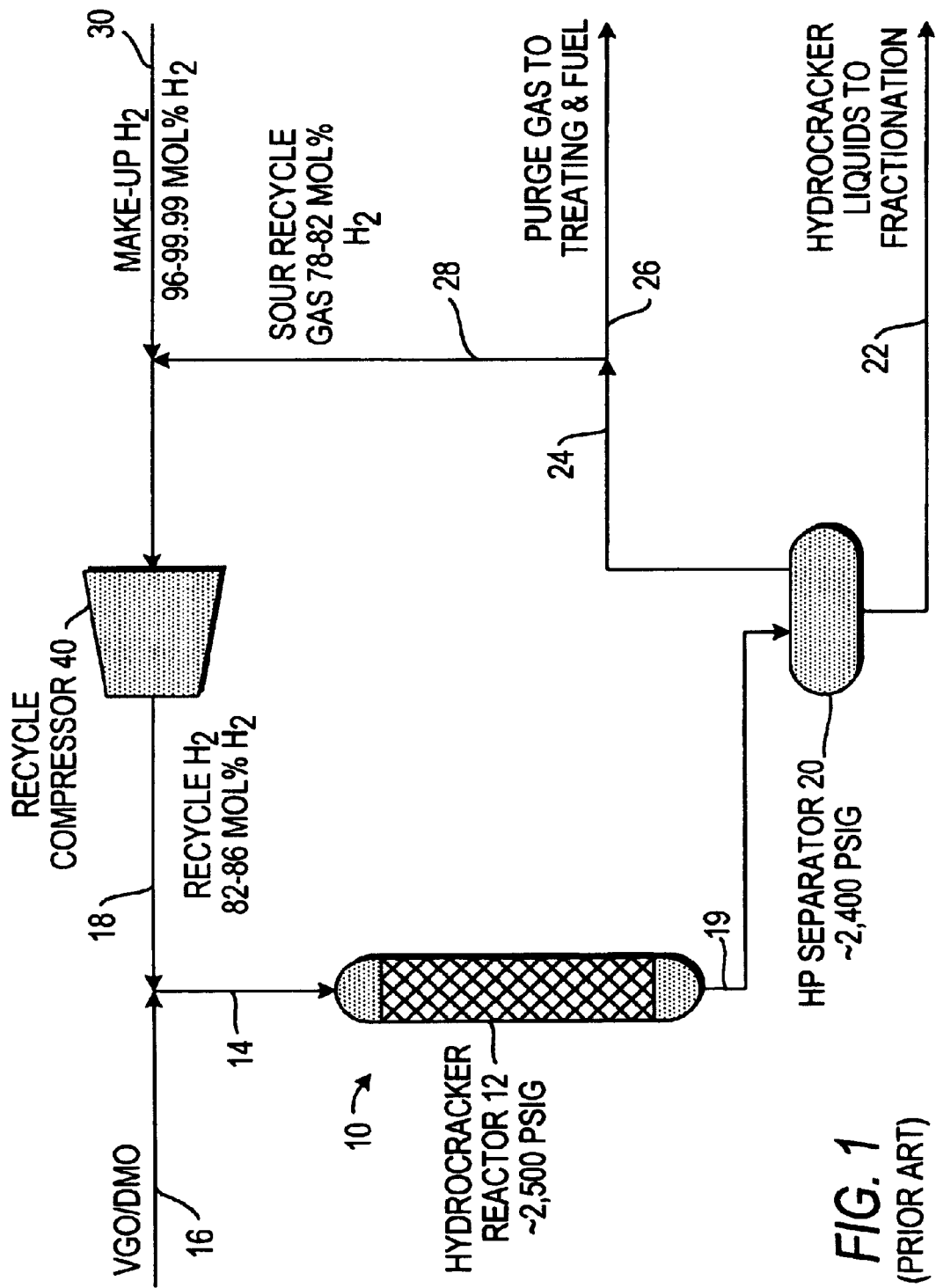
FIG. 1 is a simplified schematic representation of a hydrocracking plant of the prior art.
Figure 2:
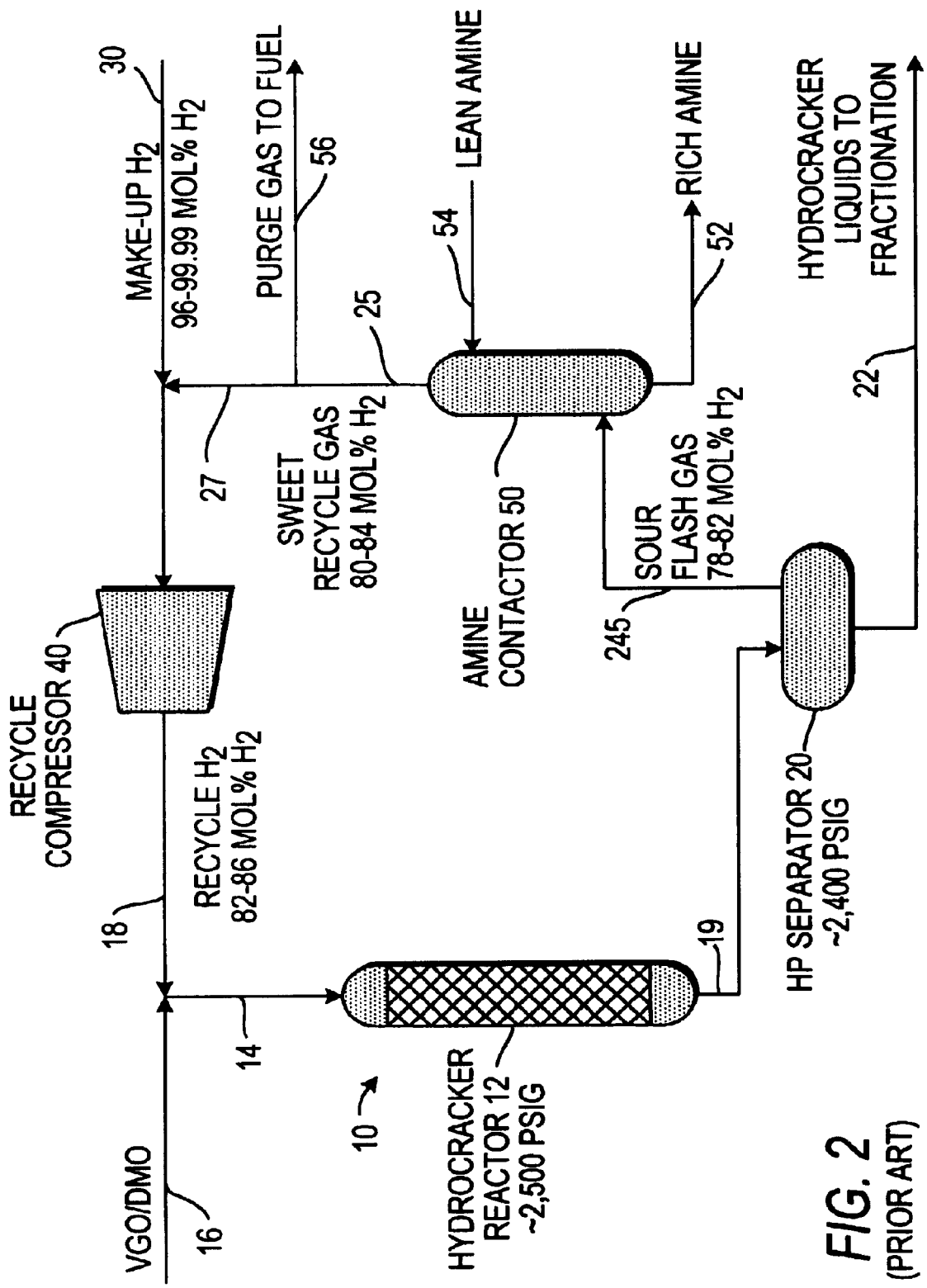
FIG. 2 is a schematic representation of a typical hydrocracking plant of the prior art similar to FIG. 1 that includes a sour gas treatment unit to remove hydrogen sulfide from the recycle gas stream.

With reference to FIG. 1, there is schematically shown a hydrocracker reactor 10 containing catalyst 12 that receives a feed stock stream 14 formed from (a) a heavy hydrocarbon liquid component 16 that is comprised of vacuum gas oil (VGO) and demetalized oil (DMO), and (b) a hydrogen gas input component 18. The hydrogen gas input component 18 comprises a recycle gas stream 28 and a makeup gas stream 30, the latter typically originating in a hydrogen generation unit (not shown) that is dedicated, at least in part, to this makeup stream. Thus, the design capacity of the hydrogen generation unit must be great enough to satisfy the maximum requirements of the reactor 10, taking into account the quantity or purity of the hydrogen provided by the recycle stream 28 with which it is combined to form the hydrogen feed component 18. Thus, any improvement in the purity of the hydrogen in the recycle gas stream will have a positive effect of the overall efficiency of the unit operation through hydrogen input stream 18, combined reactor feed stream 14 and the hydrocracking reactor 10 utilizing catalyst 12.

The reactor effluent stream 19 is at least a two-phase stream containing cracked hydrocarbon vapor and cracked hydrocarbon liquid and unreacted hydrogen. The reactor effluent stream 19 passes to high pressure separator (HP Separator) 20 which operates at a pressure only slightly reduced from that of the reactor 10. In a typical hydrocracking operation the reactor is maintained at about 2,500 psig (175.8 kg/cm$^2$g) and the HP separator operates at about 2400 psig (168.7 kg/cm$^2$g). The liquid stream 22 removed from the HP Separator 20 contains the hydrocracked products and is passed to product fractionation.

The vapor stream 24 withdrawn from the HP separator 20 contains the unreacted hydrogen, as well as a minor proportion of methane, ethane, propane, butanes and pentanes, sometimes referred to hereinafter as $C_1+$. The flashed gases from HP Separator 20 in stream 24 contain for example from about 78-82 mol % hydrogen.

In the illustration of FIG. 1, the process also includes a diversion of a portion of the high pressure gas stream 24 in the form of purge gas stream 26. The purge gas stream is required to eliminate a portion of the $C_1+$ hydrocarbon to avoid a build-up of these components in the system. However, it will be understood that the purge gas stream is approximately 80 mol % hydrogen, and that this hydrogen is lost from the system and that it must be replaced by the makeup hydrogen stream 30.

With continuing reference to FIG. 1, the reduced recycle gas stream 28 is combined with the makeup hydrogen gas stream 30 to form hydrogen input feed component stream 18 fed to reactor 10 via stream 14. The makeup hydrogen gas stream 30 is typically supplied at a purity of 96 to 99.99 mol % hydrogen. The combined input component stream 18 of the prior art process can contain from 82-86 mol % hydrogen, and typically averages about 84 mol % hydrogen.

In a typical hydrocracking system (not shown in FIGS. 1, 2, and 3, but known to one of ordinary skill in the art), the system can incorporate one of the following steps or operations:

1. the reactor effluent stream 19 is cooled to ambient temperatures prior to vapor-liquid separation in HP Separator 20 and the separated ambient temperature gases become the recycle hydrogen gas under stream 28 and the ambient temperature liquid product flows as part of stream 22 to product fractionation; or 2. the HP Separator 20 is a high-pressure, high-temperature separator, and the separated gases in stream 24 are further cooled to ambient temperatures and any condensed liquids produced by the cooling are separated from ambient temperature gases in a high pressure ambient temperature (HPAT) separator (not shown) thereby forming the ambient temperature recycle gas stream under stream 28 and ambient temperature liquids separated in HPAT separator flow to product fractionation as under stream 22; or 3. a combination of process steps 1 and 2 above, comprising partial cooling and partial separation with the objective of separating a high-pressure, ambient temperature recycle hydrogen gas stream under stream 28.

Depending upon the relative pressures of each stream, the makeup and recycle gas streams are commonly combined in either a single or a multi-stage compressor 40 upstream of the reactor 10. The recycle gas stream 28 enters the compressor at about 2,400 psig (168.7 kg/cm$^2$g) and 100 to 140° F. (37.8 to 60° C.). The combined hydrogen gas component exits the compressor at the reactor operating pressure, which in this representative example is about 2,500 psig (175.8 kg/cm$^2$g).

Prior Art Sulfur Removal

If the heavy hydrocarbon liquid component being fed to the hydrocracker includes sulfur-containing compounds, as is most common, the flash gas stream 24 will contain a minor portion of hydrogen sulfide gas. In order to avoid a build-up of hydrogen sulfide in the system and its deleterious effects on the catalyst, it must be removed.

As schematically illustrated in the prior art process of FIG. 2, this entire sour flash gas stream 24S is passed to an amine contact zone 50. The sour flash gas 24S is typically contacted with an amine solution in counter-current flow, the lean amine solution 54 entering the top of the contactor 50 and the rich amine solution 52 containing the sulfur being withdrawn from the bottom of the zone 50. In a further processing of the rich amine solution 52, which forms no part of the present invention, the sulfur is eventually recovered for its commercial value as elemental sulfur and the regenerated sweet lean amine solution is returned as stream 54 to zone 50.

With continuing reference to FIG. 2, the sweet recycle gas stream 25 leaving zone 50 contains for example from about 80 to 84 mol % hydrogen, the relatively purity having been increased by the removal of the sour hydrogen sulfide component. In a typical process, a minor portion of the sweet recycle gas is withdrawn as purge gas stream 56. The purge gas can be used as refinery fuel or further processed, which process steps form no part of the present invention. However, as in the example of FIG. 1, the purge gas also contains hydrogen which is lost to the unit operation, and must be replaced in the makeup stream 30.

The remaining recycle gas stream 27 downstream of the purge gas take-off is passed to a compressor 40, and this and the subsequent processing steps are essentially the same as described above in connection with FIG. 1.

It will be understood that the hydrogen gas input component stream 18 of FIG. 2 will typically have a purity that is at the higher end of the 82 to 86 mol % hydrogen range, due to the relatively higher purity of the sweet recycle gas stream 27 as compared to recycle gas stream 28 of FIG. 1.

In both of the prior art processes described with references to FIGS. 1 and 2, the balance of gases in the recycle streams 28 and 27 are respectively, principally $C_1$ to $C_5$ hydrocarbons. These gases pass through the HP separator 20 and build up in the system. The standard approach to this problem by the prior art has been to purge a small portion of the recycle gas stream, which as previously noted, also results in a loss of hydrogen from the system.

In typical prior art processes such as those described with reference to FIGS. 1 and 2, the separated high-pressure liquid product streams as represented by stream 22, whether they are at high temperatures or ambient temperatures, are conventionally cooled and let down in pressure in order to separate the lighter hydrocarbons from the cracked hydrocarbon liquid product, such separation taking place in low pressure (LP) vapor-liquid separators to produce separated LP gases and LP liquids. It should be understood that such LP gases contain hydrogen and can be compressed and recycled back to reactor 10 after processing through compressor 40 through stream 18 and stream 14. It should be further understood that this operating process configuration is quite suitable to the improved process of this invention.

A first preferred embodiment of the invention will be described with reference to FIG. 3. It will be understood that the process reactor 10 and HP separator 20 operate under conditions as described above in reference to FIGS. 1 and 2, respectively. The same reference numbers are used to describe common elements and like process streams.

In accordance with the improved process of this invention, the effluent from the hydroprocessing reactor 10 passes through a high-pressure separator 20 from which the effluent liquid stream 22 and the effluent gas or vapor stream 24 are removed as described above. The ambient temperature effluent gas stream 24 comprises unreacted hydrogen and methane and heavier hydrocarbons, the latter components referred to as C1+. The ambient temperature gas stream 24 is chilled by passing through heat exchanger 60 supplied by refrigerant chiller 61 to a temperature in the range of between 70° F. (21.2° C.) and −30° F. (−35° C.), preferably in the temperature range of 0° F. (−17.8° C.) and −20° F. (−28.9° C.), and most preferably in the temperature range of −10° F. (−23.3° C.) and −15° F. (−26.1° C.). The lower temperature limit is determined by the carbon steel metallurgy suitable for the refinery system. The chilled effluent gas stream 26 and any liquid condensate formed by the chilling process in heat exchanger 60 is counter-currently contacted with a liquid stream 98, comprising at least one refinery solvent in the absorption zone of stripping column 70.

Refinery solvent stream 98 is comprised of one or more individual refinery solvents delivered as separate streams 92A, 92B, 92C . . . 92X, the selection and flow rate of which are determined by a corresponding set of valves and associated automatic controllers, depicted schematically as valve block 94. The operation of the valve controllers in 94 is directed by processor/controller 100, which in one preferred embodiment is a programmed general purpose computer, that is operably connected to valves 94 via conduit 96, or other wireless communication means.

Figure 3:
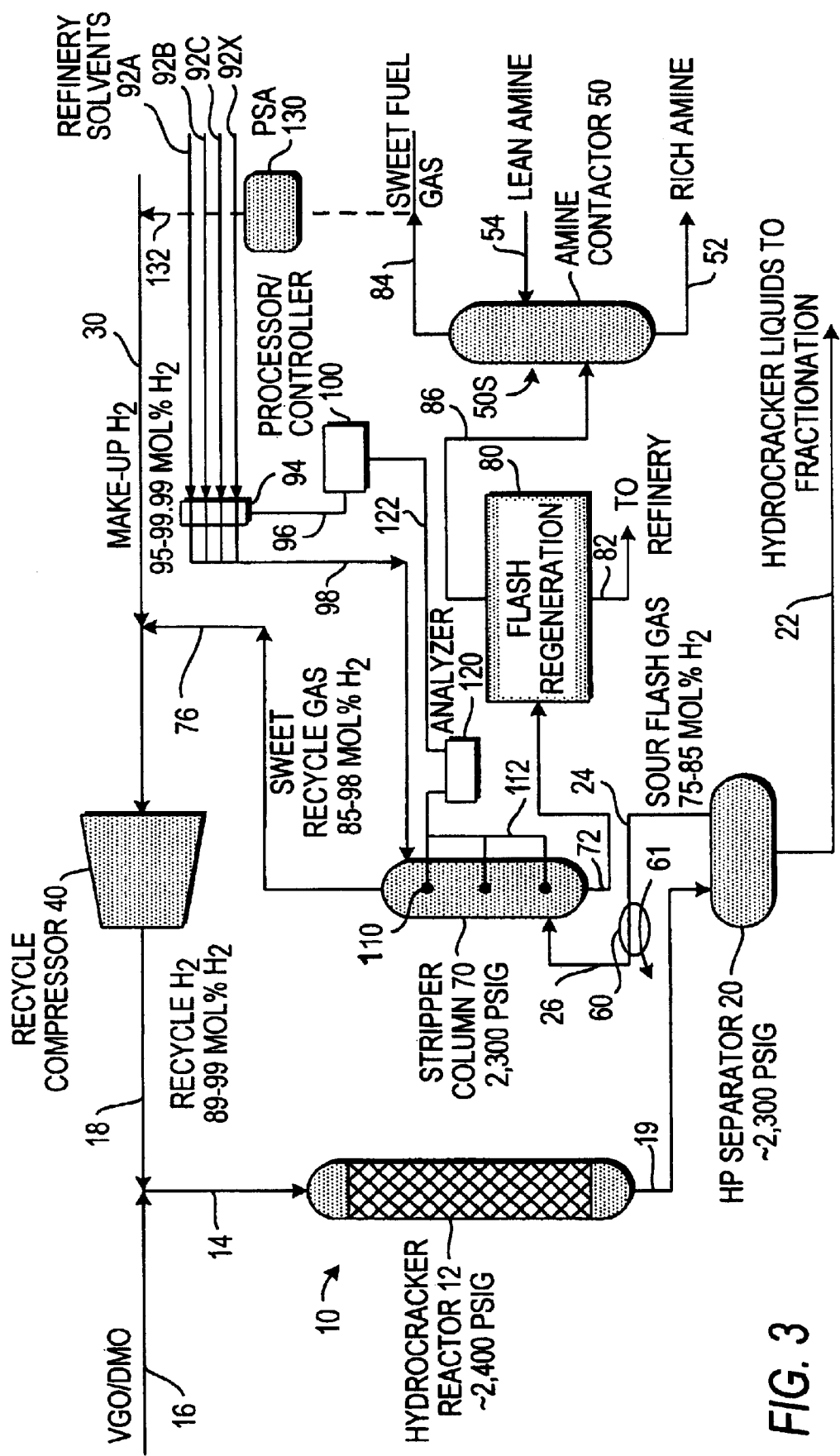
FIG. 3 is a schematic representation of one embodiment of an improved hydrocracking plant in accordance with the invention.

With continuing reference to FIG. 3, absorber column 70 is provided with a plurality of sensors in the form of probes 110 that are vertically disposed in the gas stream flow path to obtain representative samples. The top-most probe 110 is preferably positioned in column 70 where the refinery solvent stream 98 is introduced.

The refinery solvents 92A-92X can be withdrawn from product conduits under pressure and delivered directly, or admitted to separate storage vessels where they are held until needed for addition to stream 98.

Gaseous samples from probes are fed to hydrocarbon analyzer 120 via separate conduits 112 for analysis. The results of each analysis are output from analyzer 120 in the form of appropriately coded digital signals and communicated via cable 122 to the memory of programmed computer 100. Using the program algorithms, the amount of hydrogen and/or the hydrocarbons and acid gas is entered into the operating system and compared to pre-programmed parameters relating to the desired or design composition of the gas stream at one or more of the sampling points 110. If the concentration or content of one or more of the non-hydrogen components in the gas stream is greater than the predetermined design or optimum concentration, one or more of the refinery solvents 92A-92X are selected and/or the flow rate is increased into stream 98 in order to increase the volume of refinery solvent that will absorb the excess non-hydrogen component(s). In this way, the mole-percentage of hydrogen in the absorber off-gas stream 76 is maximized.

The methane and heavier hydrocarbons are absorbed from the chilled gas stream 26 to produce a hydrogen-rich gas stream 76 containing hydrogen at a purity of 85 to 95 mol %, or higher. The liquid effluent from absorption zone 70 is a rich refinery solvent stream 72 that contains the absorbed $C_1+$ hydrocarbons and acid gas originally present in stream 24.

Depending upon the relative pressures of stream 76 and stream 30, the hydrogen-rich recycle stream 76 is combined with the hydrogen make-up stream 30 either after compressor 40 or compressed together in compressor 40 and forms the hydrogen input stream 18 that is added to the reactor feed stream 16 at an operating pressure of, e.g., 2,400 psig (175.8 $kg/cm^2g$).

The rich liquid solvent stream 72 from the bottom of absorption zone 70 is passed to at least one flashing stage 80, but preferably to a plurality of sequential flash drums (not shown). Through pressure let down in flash drums in accordance with procedures well known in the art, the flash gas stream 86 containing absorbed non-hydrogen components $C_1+$ hydrocarbon components is separated to form the preferred lean liquid solvent stream 82 comprising $C_4$ through $C_{10}$ components that are present in the HP Separator gas stream 24. The lean solvent stream 82 is returned to the refinery.

The absorption zone 70 can comprise a column with at least one mass-transfer packed sections or fitted with mass-transfer trays in which the chilled effluent gas stream 25 containing hydrogen is passed upward in counter-current flow to the chilled lean liquid solvent stream 74.

In this embodiment, the feed stock 16 to hydrocracker 10 contains sulfur compounds and the separated high-pressure ambient temperature effluent gas stream 24 will contain hydrogen sulfide. In the practice of the process of this invention as described above, the hydrogen sulfide will also be absorbed in the lean liquid solvent 74 with the $C_1+$ hydrocarbon components. In this case, the recycled gas stream 76 is sweetened in the absorption zone 70 and therefore requires no amine treatment as is typical in the processes of the prior art.

The rich-solvent liquid absorber effluent stream 72 containing the hydrogen sulfide and the $C_1+$ components is passed to one or more flash regeneration units 80. Following the flash regeneration step, the sour flash gas stream 86 containing the hydrogen sulfide and $C_1+$ components is passed to amine treatment zone 50S to remove the hydrogen sulfide from the gas. The sweetened $C_1+$ gas stream 88 removed from the amine contact zone 50S can be used as sweet refinery fuel or passed for further processing and/or separation of its components.

In the embodiment illustrated in FIG. 3, stream 84 is passed to pressure swing absorption, or PSA unit 13 where additional hydrogen gas is extracted in accordance with this well-known process. The hydrogen stream 132 is added to hydrogen make-up stream 30.

The sulfur-rich liquid amine stream 56 is processed in accordance with well known methods to recover sulfur and the lean liquid amine stream 58 is returned to the amine contact zone 50S.

Since the flow rate of stream 86 of FIG. 3 in the improved process of this invention is significantly smaller than the flow rate of stream 24S of the prior art processes, the amine treatment requirements for amine zone 50S in the process of this invention are substantially lower than those of amine zone 50 in prior art processes. However, it should be understood that the process of this invention can be effectively utilized downstream of an amine treatment zone 50 in accordance with FIG. 2, whereby the HP Separator flash gas stream 24S is sweetened prior to the absorption of $C_1+$ components in absorption zone 70 in accordance with the process of FIG. 3.

As previously described under prior art processes in accordance with FIG. 1 and FIG. 2, wherein the HP Separator liquid stream 22 is let down in pressure to separate additional hydrogen from LP separators to form LP gases that are recycled back to reactor 10, these separated gases can be compressed and co-processed in absorption zone 70 of FIG. 3, or separately processed in a low-pressure absorption zone 70LP (not shown) whereby low pressure 90-99 mol % hydrogen is produced from absorption zone 7OLP. This low pressure, higher purity hydrogen stream may then be compressed and combined with recycle stream 76 of FIG. 3 for returning to reactor 10.

From the above description it will be understood that the invention relates broadly to an improvement in the process for hydrogenating a feedstream in a hydroprocessing reactor, the feedstream comprising a heavy hydrocarbon liquid component and a hydrogen gas input component, the hydrogen gas input component comprising a recycle gas stream and a makeup gas stream, the reactor producing an effluent liquid stream and an effluent gas stream, the effluent gas stream comprising unreacted hydrogen and non-hydrogen components, such as methane and heavier hydrocarbons, the improvement comprising:

a) cooling the separated effluent gas stream to a temperature in the range of—-30° F. to 30° F. (-1° C.);

b) counter-currently contacting the cooled effluent gas stream with a liquid refinery solvent stream in an absorption zone to absorb the non-hydrogen components from the effluent gas stream to produce a hydrogen-rich gas stream containing 85 to 98 mol % hydrogen and a rich liquid solvent stream;

c) recovering the hydrogen-rich gas stream from the absorber zone;

d) adding the hydrogen-rich gas stream to the hydroprocessing reactor feedstream as the recycle gas stream; and e) flashing the rich liquid solvent stream in at least one flashing stage to produce the lean liquid solvent stream comprising $C_4$ to $C_{10}$ components present in the separated effluent gas stream.

In an alternative embodiment of this process, where the heavy hydrocarbon liquid component feed contains sulfur and the methane and heavier hydrocarbon gas product stream obtained in step (e) contains hydrogen sulfide, the process includes following step (e) the further steps of:

f) contacting the methane and heavier hydrocarbon gas product with a lean amine solution in a treatment zone for removing the hydrogen sulfide and thereby providing a sweetened methane and heavier hydrocarbon gas product;

g) recovering the $H_2S$-rich amine solution from the treatment zone; and h) passing the $H_2S$-rich amine solution through a regeneration column for producing a lean amine solution for contacting in step (f).

In yet an another embodiment, where the heavy hydrocarbon liquid component feed contains sulfur, and the separated effluent gas stream comprising unreacted hydrogen and methane and heavier hydrocarbons contains hydrogen sulfide, the process includes the further steps of:

i) contacting the separated effluent gas stream with a lean amine solution in a treatment zone to remove the hydrogen sulfide and thereby provide a sweetened hydrogen and methane and heavier hydrocarbon gas stream for cooling in step (a);

j) recovering the $H_2S$-rich amine solution from the treatment zone; and k) passing the $H_2S$-rich amine solution through a regeneration column for producing a lean amine solution for contacting in step (i).

In the practice of the process of this invention, the hydroprocessing reactor is selected from the group consisting of hydrodesulfurization, hydrocracking, hydrodenitrification, hydrodealkylation and hydrotreating reactors. When the hydroprocessing reactor is a hydrocracking reactor, the reactor operates at a pressure in the range of 500 psig (35.1 kg/cm$^2$g) to 5,000 psig (351.5 kg/cm$^2$g), more preferably in the range of 1,000 psig (70.3 kg/cm$^2$g) to 3,000 psig (210.9 kg/cm$^2$g). When the reactor is selected from the group consisting of hydrodealkylation and hydrotreating, the reactor operates at a pressure in the range of 200 psig (14.1 kg/cm$^2$g) to 3,000 psig (210.9 kg/cm$^2$g).

In another embodiment of this invention, the effluent liquid product and gas streams from the reactor are passed through a high pressure separator operating at a pressure in the range of 200 psig (14.1 kg/cm$^2$g) to 5,000 psig (351.5 kg/cm$^2$g), more preferably at a pressure in the range of 200 psig (14.1 kg/cm$^2$g) to 3,000 psig (210.9 kg/cm$^2$g).

In a further embodiment, the effluent gas stream and lean liquid solvent stream are contacted in an absorber zone at a pressure in the range of 200 psig (14.1 kg/cm$^2$g) to 5,000 psig (351.5 kg/cm$^2$g), more preferably at a pressure range of 200 psig (14.1 kg/cm$^2$g) to 3,000 psig (210.9 kg/cm$^2$g).

The process of this invention is operated to provide the hydrogen gas input component of the reactor feed stream which contains 85-98 mol % hydrogen, and the makeup gas stream contains 85 to 98 mol % hydrogen.

In the improved process, the separated effluent gas stream is chilled to a temperature between 0° F. (−17.8° C.) and −20° F. (−28.9° C.), more preferably the effluent gas stream is cooled to a temperature in the range of −10° F. (−23.3° C.) to −15° F. (−26.1° C.).

In the practice of the process of the invention where the separated effluent gas stream contains water, the separated effluent gas stream is co-chilled with ethylene glycol and the ethylene glycol/water mixture is separated from the chilled hydrocarbon gas and hydrocarbon liquid streams prior to entering the methane absorber.

The process of the invention is particularly useful when the heavy hydrocarbon component is selected from the group consisting of naphtha, kerosene, diesel, light vacuum gas oil, heavy vacuum gas oil, demetalized oil, coke-gas oil residue, fuel oil, aromatics, vacuum residue and whole petroleum crude.

In another preferred embodiment, the recovered hydrogen-rich gas stream from an absorption zone is further cross-heat exchanged with the reactor effluent gas stream prior to compression for recycling to hydroprocessing reactor.

In a preferred embodiment, the lean liquid solvent stream enters the absorption zone at a temperature in the range of +30° F. (−1.1° C.) to −40° F. (−40° C.), more pre at a temperature in the range of 0° F. (−17.8° C.) to −20° F. (−28.9° C.), and most prefer at a temperature in the range of −10° F. (−23.3° C.) to −15° F. (−26.1° C.).

In a further embodiment, the rich liquid solvent stream passes through at least two successive flash separators, wherein the separated gases from the first of the successive flash separators are compressed and returned to the absorption zone as stripping gas. For solvent regeneration, the flash separators are gas-liquid 2-phase separation drums, and the successive flash separators are operated at successively lower pressure than the operating pressure in the absorption zone.

In another embodiment of this invention, the separated liquid product from the high pressure separator is let down in pressure to produce a low pressure liquid and gas stream. The low pressure liquid and gas stream is separated in a low pressure separator to produce a low pressure hydrogen-rich gas stream. The low pressure hydrogen-rich gas stream is either (i) compressed and chilled prior to entering the absorption zone of step (b) for co-processing; or (ii) chilled and contacted with a lean solvent stream comprised of $C_4$ to $C_{10}$ components present in the reactor effluent gas stream to produce a low pressure high-purity hydrogen recycle stream containing 85 to 98 mol % hydrogen.

Since numerous modifications and variations of the present invention will be apparent to those of ordinary skill in the refinery process art in light of the above teachings and, therefore, are within the scope of the appended claims, the invention can also be practiced otherwise than as particularly described.

As will appreciated by one of ordinary skill in the art, other variations and modifications to the apparatus and methods of the invention described above can be made. The full scope of the invention is to be determined with reference to the claims which follow.

I claim:

1. A process for the recovery of hydrogen from a gaseous feedstream containing hydrogen and non-hydrogen components including methane and higher hydrocarbons and, optionally, hydrogen sulfide, said gaseous feedstream being derived from the off gases of a hydroprocessor located in a refinery facility, the process comprising:

a. admitting the gaseous feedstream into the bottom of a stripping column;

b. contacting the gaseous feedstream with at least one sampling device and obtaining a sample of the feedstream for analysis;

c. analyzing the sample to determine the composition of the hydrogen-containing gaseous feedstream;

d. passing the gaseous feedstream in counter-current flow in the column to contact a liquid absorbent stream comprised of at least one predetermined refinery solvent that absorbs the non-hydrogen components and not the hydrogen, said refinery solvent originating in the refinery facility; and e. controlling the flow rate of the at least one liquid absorbent refinery solvent in response to the determination of the composition of the hydrogen-containing gas stream to maximize the hydrogen content of the gas stream exiting the stripping column.

2. The process of claim 1, wherein the analysis of the hydrogen-containing gaseous feedstream includes admitting a sample of the gas stream from the at least one sampling device into a hydrocarbon analyzer for analysis and producing the resulting analytical data in digital form.

3. The process of claim 2 which further includes the step of communicating the digital analytical data to a programmed processor and associated controller.

4. The process of claim 3, wherein the controller is operably connected to valve control means which control the selection and flow rate of the at least one refinery solvent into the stripping column, whereby the adsorption of non-hydrogen components by the refinery solvent is maximized.

5. The process of claim 1, wherein the at least one sampling device is a probe, and the analysis includes withdrawing a gaseous sample of the feedstream upstream of the position in the stripping column where the one or more refinery solvents enter the column.

6. The process of claim 5 which includes the step of withdrawing a sample for analysis from at least one position in the stripping column downstream of the position in the column where the one or more refinery solvents enter the column.

7. The process of claim 1, wherein the flow rate of the at least one refinery solvent is controlled by a programmed general purpose computer, the computer including a memory device, the process further comprising storing in the memory device the physical characteristics of the at least one refinery solvents, the physical characteristics including the solubility of the non-hydrogen components under a range of stripping column design operating conditions.

8. The process of claim 1, wherein the stripping column is operated at a temperature in the range of −30° F. to 70° F.

9. The process of claim 8, which includes introducing the one or more refinery solvents into the stripping column at a temperature in the range of −30° F. to 70° F.

10. The process of claim 1 which further includes introducing the hydroprocessor off gases into a volume of the refinery solvent at the bottom of the stripping column and agitating the mixture to thereby enhance the mass transport of the non-hydrogen components into the refinery solvent.

11. A process for the recovery of hydrogen from a gaseous feedstream containing hydrogen and non-hydrogen components including methane and higher hydrocarbons and, optionally, hydrogen sulfide, said gaseous feedstream being derived from the off gases of a hydroprocessor located in a refinery facility, the process comprising:
   a. determining the relative proportions and composition of the hydrogen and the non-hydrogen components of the gaseous feedstream;
   b. identifying and rating the available refinery solvents produced in the refining facility for their capacity to absorb hydrogen and the non-hydrogen components of the feedstream;
   c. selecting from the available refinery solvents one or more refinery solvents for use in a stripping column operated at predetermined conditions of temperature and pressure to maximize the adsorption of non-hydrogen components from the gaseous feedstream in said stripping column;
   d. admitting the gaseous feedstream into the bottom of a stripping column provided with at least one sampling device;
   e. passing the gaseous feedstream in counter-current flow to contact with a liquid absorbent steam consisting of the one or more refinery solvents selected in step (c);
   f. periodically analyzing the content of the gaseous feedstream in the stripping column to determine the relative proportions and composition of the hydrogen and the non-hydrogen components; and
   g. making any change necessary to the selection and flow rates of the one or more refinery solvents entering the stripping column to thereby maximize adsorption of the non-hydrogen components from the feedstream in the stripping column.

12. The process of claim 11, wherein the determination of the relative proportion and composition of the non-hydrogen component of the feedstream includes admitting a sample of the gas stream from the sampling device into a hydrocarbon analyzer for analysis and generating the resulting analytical data in digital form.

13. The process of claim 12 which further includes the step of transmitting the digital analytical data to a programmed processor and associated controller.

14. The process of claim 13, wherein the controller is operably connected to valve control means which control the selection and flow rate of the one or more refinery solvents into the stripping column, whereby the adsorption of non-hydrogen components by the refinery solvent is maximized.

15. The method of claim 14 which further includes the steps of measuring the operating pressure and temperature of the stripping column and transmitting this data to the processor.

16. The method of claim 11 in which the hydrogen concentration in the stripping column off gas stream is in the range of 85% to 98% mol volume.

17. The process of claim 11, wherein the refinery solvent fed to the stripping column is selected from the group consisting of compounds of butane, pentane, hexane, heptane, iso-octane, n-octane, methylcyclohexane, 1,2,4-trimethylbenzene, iso-paraffins, gasoline, and mixtures thereof.

18. The process of claim 17, wherein the refinery solvent is a mixture of iso-octane and methylcyclohexane.

19. The process of claim 11 which includes operating the stripping column at a temperature in the range of −30° F. to 70° F.

20. The process of claim 11, wherein a fresh stream of the one or more refinery solvents is introduced in the stripping column.

* * * * *